United States Patent [19]

Westhusin

[11] 4,274,592

[45] Jun. 23, 1981

[54] ADJUSTABLE RISER MEMBER

[76] Inventor: Daryl L. Westhusin, 4940 N. Maize Rd., Maize, Kans. 67101

[21] Appl. No.: 91,261

[22] Filed: Nov. 5, 1979

[51] Int. Cl.³ .............................................. B05B 15/06

[52] U.S. Cl. .................................................... 239/200

[58] Field of Search .................................. 239/200-207

[56] References Cited

U.S. PATENT DOCUMENTS

| | | | |
|---|---|---|---|
| 1,833,040 | 11/1931 | Rader | 239/203 X |
| 3,083,914 | 4/1963 | Smith | 239/201 X |
| 3,317,144 | 5/1967 | Muschett | 239/204 |
| 3,776,463 | 12/1973 | Dyck | 239/204 |

*Primary Examiner*—Richard A. Schacher
*Attorney, Agent, or Firm*—Phillip A. Rein

[57] ABSTRACT

This invention relates to an adjustable riser member mounted between a buried inlet water supply line and a yard sprinkler head as part of an overall water sprinkler head. The adjustable riser member includes (1) a main support body assembly; (2) a riser assembly mounted in the main support body assembly for longitudinal movement therein; (3) a threaded support assembly mounted in the main support body assembly; and (4) a seal assembly mounted on a top portion of the main support body assembly. The support water enters a lower end of the main support body assembly and flows through an upper end of the riser assembly for discharge into the yard sprinkler head. The riser assembly is rotatable in the threaded support assembly for longitudinal adjustment thereof with the seal assembly preventing any water leakage from the main support body assembly.

2 Claims, 6 Drawing Figures

16
76
20
112
3
3
18
28
14

46
48
30
28
6
6
36
34
26
18
32
42
28
44

44
40
36
28
18

64
71
66
56
60
70
20
54
58
62
22
52
50
54
12
40
28
18
26
42

ADJUSTABLE RISER MEMBER

PRIOR ART

Any references to the prior art is not known to the applicant as a patent search was not deemed necessary by the applicant.

The applicant is engaged in the business of installation and servicing of water sprinkling systems and has never seen a similar device for adjusting the height of a sprinkler head.

PREFERRED EMBODIMENT OF THE INVENTION

This invention is an adjustable riser member used in a water sprinkler system. The adjustable riser member includes (1) a main support body assembly that connects at a threaded lower connector section to an inlet water supply; (2) a threaded support assembly mounted in the main support body assembly; (3) a riser assembly resembling a pipe member mounted in the main support body assembly and engages the threaded support assembly; and (4) a seal assembly mounted about an upper end of the main support body assembly and engages a portion of the riser assembly to prevent water leakage therefrom. The riser assembly has a lower threaded section engaged with the threaded support assembly for axial movement relative to the stationary main support body on rotation of the riser assembly to accomplish the desired function of this invention.

OBJECTS OF THE INVENTION

One object of this invention is to provide an adjustable riser member which can be installed in any existing water sprinkler system to be vertically movable to account for rising or settling of the surrounding grass or soil.

Another object of this invention is to provide an adjustable riser member that is constructed of non-corrosive material so as to not deteriorate.

One other object of this invention is to provide an adjustable riser member that has a minimum of parts and is easily rotatable to adjust the height thereof.

Various other objects, advantages, and features of the invention will become apparent to those skilled in the art from the following discussion, taken in conjunction with the accompanying drawings, in which:

FIGURES OF THE INVENTION

Figure 1:
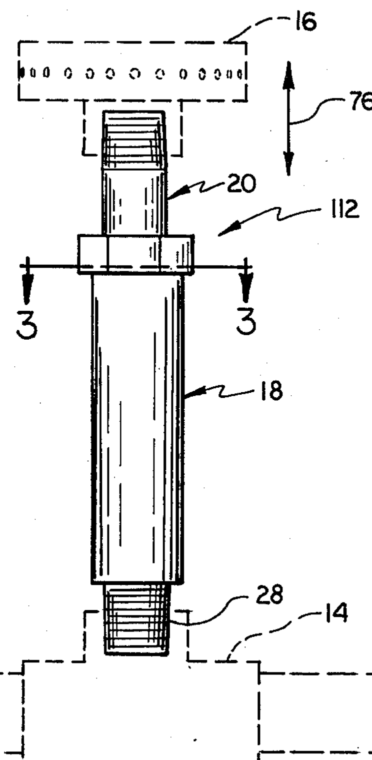
FIG. 1 is a side elevational view of the adjustable riser member of this invention connected at (1) a lower end to a water supply line, and (2) connected at an upper end to a sprinkler line as shown in dotted lines.

The following is a discussion and description of preferred specific embodiments of the new adjustable riser member of this invention, such being made with reference to the drawings, whereupon the same reference numerals are used to indicate the same or similar parts and/or structure. It is to be understood that such discussion and description is not to unduly limit the scope of the invention.

DESCRIPTION OF THE INVENTION

Figure 2:
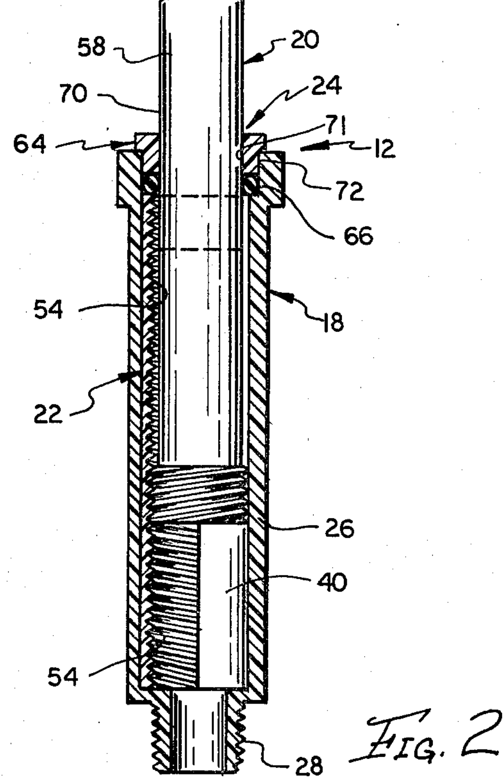
FIG. 2 is a sectional view of the adjustable riser member of this invention with vertical movement thereof shown in dotted lines.

As shown in solid lines in FIGS. 1 and 2, the adjustable riser member of this invention, indicated generally as 12, is connected at a lower end to an inlet water supply line 14 and at an upper end to a sprinkler head member 16. The adjustable riser member 12 includes (1) a main support body assembly 18 that threadably connects at a lower end to the inlet water support line 14; (2) a riser assembly 20 mounted in the main support body assembly 18 and longitudinally movable therein; (3) a threaded support assembly 22 mounted in the main support body assembly 18 and engagable with the riser assembly 20; and (4) a seal assembly 24 connected to the main support body assembly 18 and engagable with the riser assembly 20 to form a seal therewith for reasons to become obvious.

The main support body assembly 18 includes (1) a cylindrical support body member 26 integral with a (2) connector section 28 (3) an upper stepped section 30 and (4) a bottom stepped section 32. The support body member 26 includes a support body 34 having an opening 36 therethrough and an integral top head portion 38.

The support body 34 includes an integral semi-circular stepped wall section 40 that resembles in length and thickness the threaded support assembly 22 as will be explained but having no threads thereon.

Figure 3:
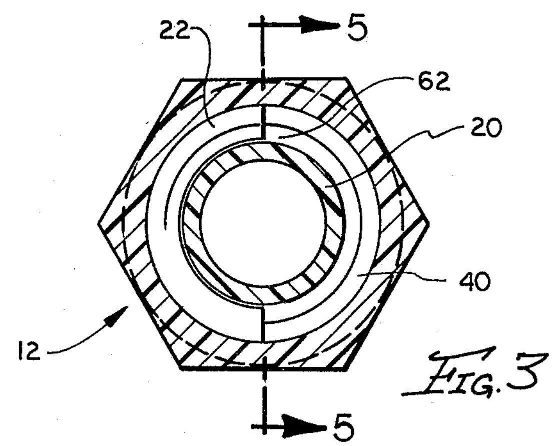
FIG. 3 is an enlarged sectional view taken along line 3—3 in FIG. 1.

As noted in FIG. 3, the top head portion 38 is of hexagonal shape to be grasped by a pipe or crescent wrench for assembly and other reasons to be explained.

The bottom stepped section 32 is integral with the connector section 28 as noted in FIGS. 1 and 2. The connector section 28 consists of a short male threaded section 42 with a central opening 44 into the opening 36 in the support body member 26 to receive and direct fluid therein as will become obvious.

The upper stepped section 30 receives the seal assembly 24 therein and includes a vertical wall 46 integral with a horizontal wall 48.

Figures 4, 5, 6:
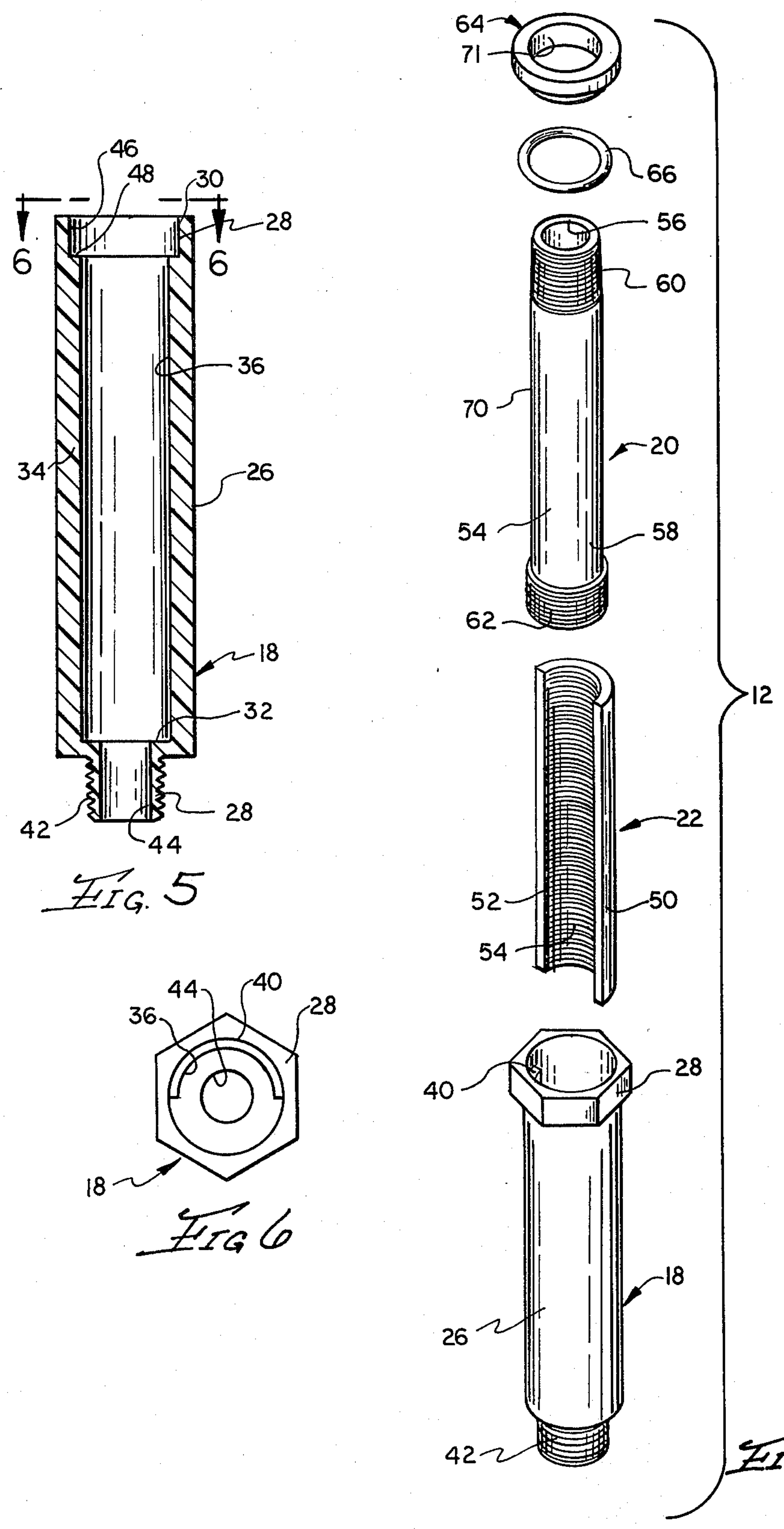
FIG. 4 is an exploded view of the adjustment riser member of this invention.
FIG. 5 is a sectional view taken along line 5—5 in FIG. 2 illustrating only a main support body assembly of the adjustable riser member of this invention.
FIG. 6 is a top view of the main support body assembly taken along line 6—6 in FIG. 5.

As noted in FIG. 4, the threaded support assembly 22 includes a semi-circular body section 50 resembling the stepped wall section 40 in length and thickness. However, the body section 50 includes a support section 52 integral with an internal female threaded section 54 extended the length thereof.

The riser assembly 20 resembles an elongated pipe member 54 having a central hole 56 therein for fluid flow therethrough. The pipe member 54 includes a cylindrical body member 58 having an integral (1) upper male threaded section 60; and (2) lower male threaded section 62. The lower male threaded section 62 engages the female threaded section 54 in a manner to be explained.

As noted in FIGS. 2 and 4, the seal assembly 24 includes a cap seal member 64 and an O-ring member 66. The O-ring member 66 is of a conventional structure constructed of rubber or the like and rests against the horizontal wall 48 and vertical wall 46 of the upper stepped section 30 (FIG. 5). An inner surface of 68 of the O-ring member 66 seals against an outer surface 70 of the body member 58 of the riser assembly 20 as will become obvious.

The cap seal member 64 includes a central hole 71 and an outer stepped portion 72. The outer stepped portion 72 is received in the upper stepped section of the cylindrical support body member 26 (FIG. 2) and forces a seal of the O-ring member 66 against the body member 58. The cap seal member 64 can be mounted therein in a press fit or cemented as will normally be constructed of a plastic material.

USE AND OPERATION OF THE INVENTION

The use and function of the adjustable riser member 12 of this invention is mounted between the inlet water supply line 14 and a sprinkler head member 16 as shown in FIG. 1 in a grass watering system. The need in the industry for the adjustable riser member 12 of this invention is to raise and lower the sprinkler head member 16 as necessary due to the different levels of the supporting soil or desired height of the grass growing thereon. Normally, the soil gradually rises and the adjustable riser member 12 needs to be raised to achieve the proper height for the lawn sprinkling system.

Assembly of the adjustable riser member 12 is best shown in FIG. 4 wherein the threaded support assembly 22 is placed into the main support body assembly 18 to the portion shown in FIG. 2. It would normally be secured therein by plastic cement.

Next, the riser assembly 20 is connected to the main support body assembly 18 by threading the lower male threaded section 62 into the female threaded section 54 of the threaded support assembly 22. The upper male threaded section 60 extends upwardly and outwardly of the main support body assembly 18 (FIG. 1).

The seal assembly 24 is then connected to the main support body assembly 18 first by insertion of the O-ring member 66 into the upper stepped section 30. The cap seal member 64 is then secured in the upper stepped section 30 against the O-ring member 66 (FIG. 2).

It is obvious that the male threaded section 42 is connected to the inlet water supply line 14 and the upper male threaded section 60 is connected to the sprinkler head member 16 as shown in FIG. 1.

When the adjustable riser member 13 is required to be raised, the top head portion 38 of the main support body assembly 18 is held by a crescent wrench or the like. Then, the riser assembly 20 is rotated to raise or lower the sprinkler head member 16 as shown by the arrow 76 in FIG. 1.

The adjustable riser member of this invention provides a very necessary device needed in the industry rather than trying to use pipe nipples of different lengths, etc. The adjustable riser member is sturdy in construction, can be constructed of non-corrosive, inexpensive plastic, and is easy to install and operate.

While the invention has been described in conjunction with preferred specific embodiments thereof, it will be understood that this description is intended to illustrate and not to limit the scope of the invention, which is defined by the following claims.

I claim:

1. An adjustable riser member mountable between an inlet supply line and a discharge sprinkler head usable in a yard sprinkler system, comprising:

(a) a main support body assembly having a lower end connected to the inlet supply line;

(b) a riser assembly mounted in said main support body assembly and movable axially thereof to raise or lower the discharge sprinkler head;

(c) a seal assembly mounted in said main support body assembly and contacts said riser assembly to seal thereagainst and permit flowing only in said adjustable riser member to the discharge sprinkler head;

(d) said main support body assembly includes a cylindrical support body member having said lower end connected to the inlet supply line;

(e) an integral upper top head section of hexagonal shape so as to be grasped by a crescent or box end wrench for installing and holding same for adjustment purposes;

(f) said top head section having an upper stepped section to receive said seal assembly therein;

(g) a threaded support assembly mounted in said main support body assembly having threads thereon; and (h) said threaded support assembly constructed with a semi-circular body section that inserts into said main support body assembly with said threads being female threads to engage with said threaded section of said riser assembly to control adjustable axial movement of said riser assembly.

2. An adjustable riser member as described in claim 1, wherein:

(a) said main support body assembly having a stepped wall section of semi-circular shape to engage and cooperate with said semi-cirular body section of said threaded support assembly to contact said threaded section on said riser assembly to provide support therefor on axial movement thereof; and (b) said threaded support assembly removable from said main support body assembly for replacement, repair, or maintenance.

* * * * *